(12) United States Patent
Altheimer et al.

(10) Patent No.: US 10,831,041 B2
(45) Date of Patent: Nov. 10, 2020

(54) METHOD FOR CREATING A DESIGN OF A PRESCRIPTION SURFACE OF A MULTIFOCAL LENS AND MULTIFOCAL LENS COMPRISING SUCH A PRESCRIPTION SURFACE

(71) Applicant: RODENSTOCK GMBH, Munich (DE)

(72) Inventors: Helmut Altheimer, Baisweil (DE); Wolfgang Becken, Neuried (DE); Gregor Esser, Munich (DE); Werner Müller, Ötisheim (DE); Adam Muschielok, Munich (DE); Martin Zimmerman, Erdweg (DE)

(73) Assignee: RODENSTOCK GMBH, Munich (DE)

( * ) Notice: Subject to any disclaimer, the term of this patent is extended or adjusted under 35 U.S.C. 154(b) by 25 days.

(21) Appl. No.: 15/563,390

(22) PCT Filed: Jan. 26, 2016

(86) PCT No.: PCT/EP2016/051554
§ 371 (c)(1),
(2) Date: Sep. 29, 2017

(87) PCT Pub. No.: WO2016/155900
PCT Pub. Date: Oct. 6, 2016

(65) Prior Publication Data
US 2018/0088353 A1    Mar. 29, 2018

(30) Foreign Application Priority Data
Mar. 30, 2015   (DE) .................. 10 2015 205 721

(51) Int. Cl.
*G02C 7/06*    (2006.01)
*G02C 7/02*    (2006.01)

(52) U.S. Cl.
CPC ............. *G02C 7/065* (2013.01); *G02C 7/028* (2013.01)

(58) Field of Classification Search
None
See application file for complete search history.

(56) References Cited

U.S. PATENT DOCUMENTS

| 4,946,270 A | 8/1990 | Guilino et al. |
| 2003/0174278 A1* | 9/2003 | Esser .............. G02C 7/02 351/159.07 |

(Continued)

FOREIGN PATENT DOCUMENTS

| DE | 10 2011 009 473 A1 | 11/2011 |
| DE | 10 2010 052 936 A1 | 5/2012 |

(Continued)

OTHER PUBLICATIONS

International Search Report for Application No. PCT/EP2016/051554, dated Apr. 5, 2016 (7 pages).

(Continued)

*Primary Examiner* — William R Alexander
*Assistant Examiner* — Gary W O'Neill
(74) *Attorney, Agent, or Firm* — Womble Bond Dickinson (US) LLP; John J. Penny, Jr.

(57) ABSTRACT

In a method for creating a design of a prescription surface of a multifocal lens, in particular for a progressive spectacle lens, at first data and second data for describing at least one aberration of an eye of a proband for a first situation of use and a second situation of use, respectively, are obtained, and then a first set of parameters and a second set of parameters of a predetermined prescription surface equation are determined from the first and second data, wherein the prescription surface equation is assigned to a first reference point of the prescription surface for the first set of parameters, and is assigned to a second reference point of the prescription surface for the second set of parameters.

19 Claims, 14 Drawing Sheets

(56) References Cited

U.S. PATENT DOCUMENTS

| | | |
|---|---|---|
| 2006/0209255 A1 | 9/2006 | Donetti et al. |
| 2012/0016645 A1* | 1/2012 | Altheimer .............. G02C 7/025 703/2 |
| 2012/0105800 A1* | 5/2012 | Allione .................. G02C 7/027 351/159.74 |
| 2013/0027657 A1 | 1/2013 | Esser et al. |
| 2013/0235337 A1* | 9/2013 | Becken .................... G02C 7/02 351/159.42 |
| 2013/0261782 A1* | 10/2013 | Becken ................ G05B 19/418 700/95 |
| 2013/0265540 A1 | 10/2013 | Esser et al. |
| 2014/0049747 A1* | 2/2014 | Altheimer .............. G02C 7/028 351/159.76 |

FOREIGN PATENT DOCUMENTS

| | | |
|---|---|---|
| EP | 0 291 094 A1 | 11/1988 |
| EP | 1 240 541 B1 | 2/2008 |
| FR | 2 858 693 A1 | 2/2005 |
| JP | 2000-066148 | 3/2000 |
| JP | 2003-517639 | 5/2003 |
| JP | 2008-503773 | 2/2008 |
| WO | 98/16862 | 4/1998 |
| WO | 2012/089234 A1 | 7/2012 |

OTHER PUBLICATIONS

Notification of Reasons for Rejection from the Japanese Patent Office dated Dec. 3, 2019 in JP 2017-548059.

\* cited by examiner

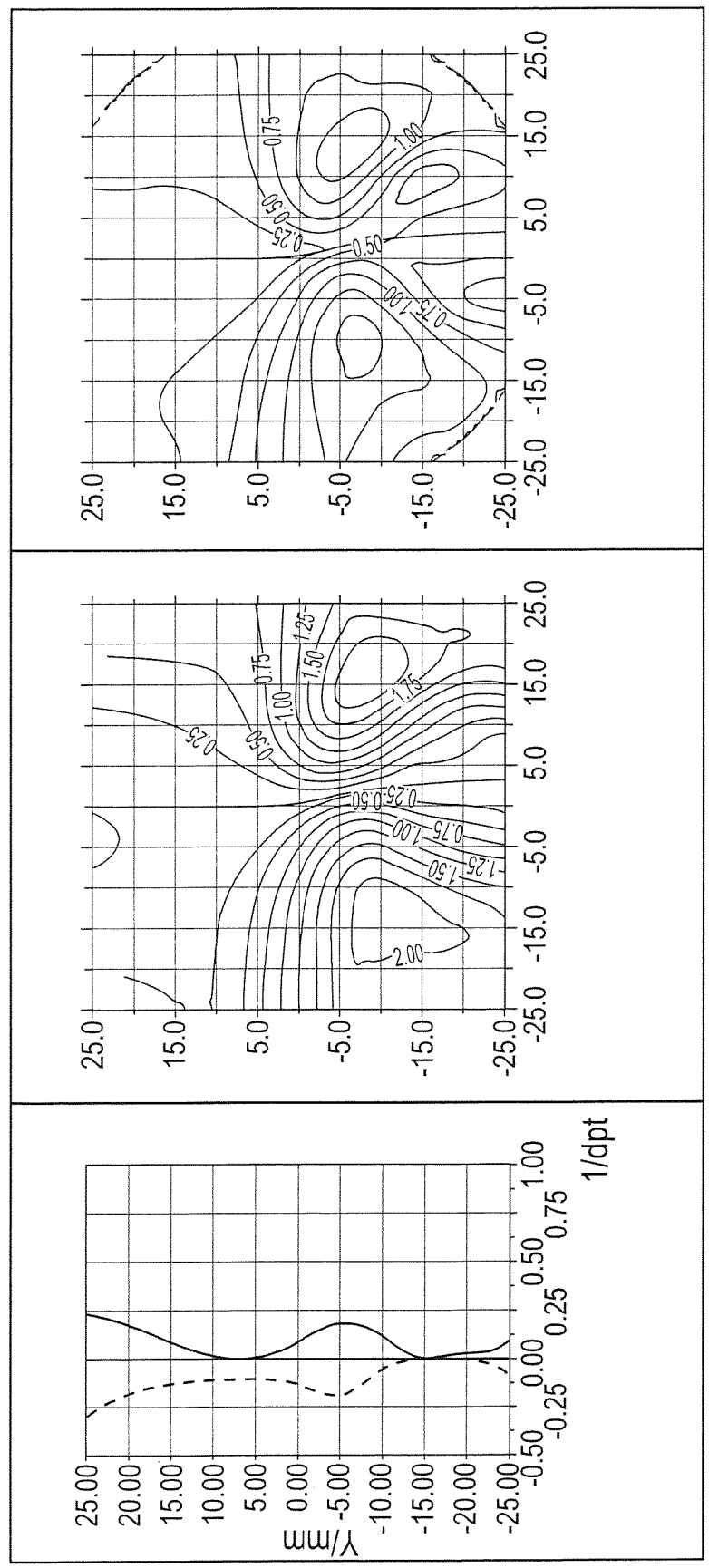

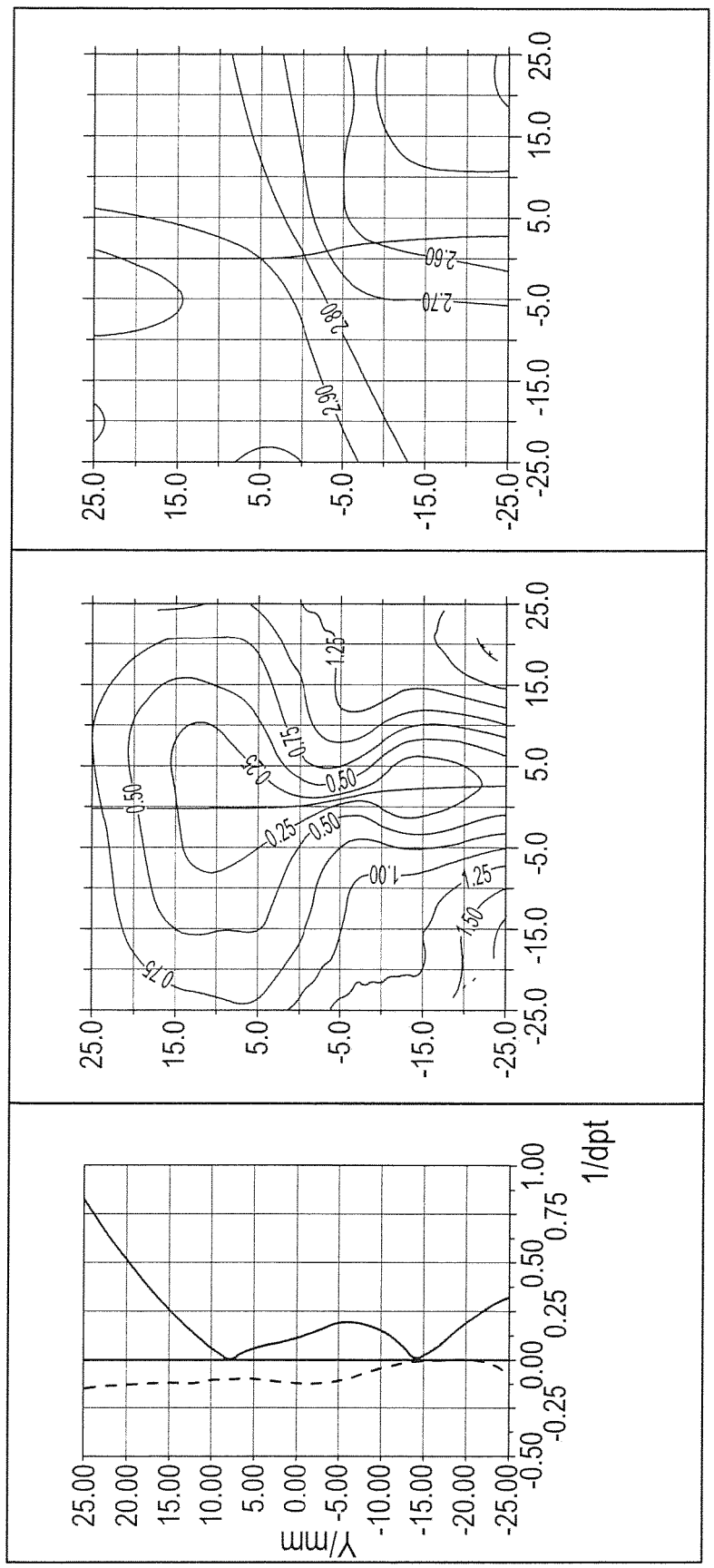

METHOD FOR CREATING A DESIGN OF A PRESCRIPTION SURFACE OF A MULTIFOCAL LENS AND MULTIFOCAL LENS COMPRISING SUCH A PRESCRIPTION SURFACE

The present application claims priority under 35 U.S.C. § 119 to German Application No. 10 2015 205 721.6, filed on Mar. 30, 2015 and under 35 U.S.C. § 365 to PCT/EP2016/051554, filed on Jan. 26, 2016, the disclosures of which are expressly incorporated herein by reference.

The present invention relates to a method for creating a design of a prescription surface of a multifocal lens as well as a multifocal lens with such a prescription surface, each in particular for a progressive spectacle lens.

In recent years, the calculation and optimization of progressive spectacle lenses in the respective situation of use has achieved a high technical and optical standard. For non-online optimized progressive spectacle lenses, a toric or an aspherical/atoric surface is used as prescription surface. These conventional prescription surfaces are the second surface which is typically the eye-sided surface/back surface, in the case of blank products, and superimposing surfaces on a previously calculated or optimized base surface, in the case of more modern free-form products in which the progressive effect and the prescriptive effect are generated with a surface. In the latter case, a function of the superimposed surface is added to a function of the base surface. These base surfaces are optimized for certain, usually spherical effects taking into account standard parameters for the position of the lenses in front of the eye of the spectacle wearer (e.g. corneal vertex distance (HSA), forward inclination (VN), frame wrap angle (FSW)), and physiological parameters (e.g. pupillary distance (PD)), and either produced as finished surfaces in the case of conventional blank products or deposited as data records.

The prescriptive effect (prescription (in particular sphere, cylinder, axis, optionally addition) in a situation of use or prescription in the case of position of use—independent measurement with a vertex refractive measuring device) can thus conventionally be adjusted precisely only at one reference point even if the individual parameters are taken into account when calculating the prescription surface. In standard progressive spectacle lenses, this point normally is the distant reference point, and in near convenience glasses, usually the near reference point. In the second important reference point (near reference point or distant reference point), greater deviations from the desired effect can occur depending on the prescriptive effect, the position in the basic curve area, addition, position of use parameters and viewing model.

Specifically, values which depend on the individual prescriptive effect and the situation of use and therefore cannot be taken into account in the progressive base surface, as for example the adjustment astigmatism (cf. e.g. DE 10 2010 052 936 A1; "Refraktionsbestimmung" by H. Diepes, 3rd revised edition, DOZ-Verlag, 2004, p. 396ff.; "Einstellastigmatismus and Listing'sche Regel" by K. Jeremias, D. Urech, project work 5, Fachhochschule Nordwestschweiz 2011; http://www.knecht. optiklexikon.com/ index.php?rubrik=1&buchstabe=E&action=lexikon) in case of astigmatic prescription or an individual near astigmatism (cf. e.g. "Nahastigmatismus in Theorie und Praxis, Ursachen, Häufigkeit und Prüfmethoden" by S. Degle, Deutsche Optiker Zeitung DOZ, July 2011, p. 56-58; "Refraktionsbestimmung" by H. Diepes, 3rd revised edition, DOZ-Verlag, 2004, p. 396ff.) cannot be corrected with a conventional prescription surface. Similarly, only the additions stored in advance can be generated. Intermediate values as prescription values are excluded. In such cases, up to now, usually an extensive and expensive online optimization of the progressive freeform surface or the atoric prescription surface had to be carried out, if an optimal corrective effect in both reference points is to be achieved.

It is the object of the invention to provide an improved method for creating a design of a prescription surface of a multifocal lens which allows a simple calculation of the prescription surface at two reference points corresponding to two different situations of use. In this context, a calculation of the prescription surface shall be understood as a creation of a design of a prescription surface. As a further development of the invention, it is also an object of the invention to provide a method for creating a design of a prescription surface of a multifocal lens with which any desired prescriptive effects at the distant and near reference points can be realized without the need of performing a full-surface optimization which is typically highly computer-intensive.

This object is achieved by the teaching of the independent claims. Particularly advantageous configurations of the invention are the subject-matter of the dependent claims.

The method for creating a design of a prescription surface of a multifocal lens according to the invention comprises: a step S10 of obtaining first data for describing at least one aberration of an eye of a proband for a first situation of use and second data for describing at least one aberration of the eye of the proband for a second situation of use; a step S20 of determining a first set of parameters and a second set of parameters of a predetermined prescription surface equation from the first and second data, wherein the prescription surface equation is assigned to a first reference point of the prescription surface for the first set of parameters, and is assigned to a second reference point of the prescription surface for the second set of parameters; a step S30 of interpolating further sets of parameters of the prescription surface equation at further coordinates of the prescription surface from the first set of parameters and the second set of parameters; and a step S40 of determining prescription surface values of the prescription area at the first reference point on the basis of the first set of parameters, at the second reference point on the basis of the second set of parameters, and at further coordinates of the prescription surface on the basis of the further sets of parameters.

According to the invention, an optimum setting of the prescription surface is carried out at a first reference point and at a second reference point. According to the invention, The transition between these two reference points is carried out by an interpolation of sets of parameters of the prescription surface equation from the first and second sets of parameters of the prescription surface equation at the two reference points. According to the invention, it is proposed not to directly interpolate, for example, the prescription surface values of the prescription surface between the two reference points, but the sets of parameters determining the prescription surface equation. In this way, an optically improved transition of the prescription surface between the two reference points can be achieved.

With the method of the invention, a design of a prescription surface of a multifocal lens can be created in technical and optical high quality with a reasonable computational effort, whereby an optimization at two reference points is included for different situations of use.

The method of the invention is preferably a computer-implemented method.

The method of the invention is particularly suitable for creating designs of prescription surfaces of multifocal lenses for progressive spectacle lenses. A multifocal lens is understood to be an ophthalmic lens in which the refractive power is different at different viewing locations.

The prescription surface may be a front surface of the lens, a back surface of the lens, a superimposing surface of a base surface, wherein the base surface may be a front surface or a back surface of the lens. A surface of the multifocal lens opposite the prescription surface can preferably be a spherical surface, a toric surface, an aspherical surface or an atoric surface. A surface of the multifocal lens opposite the prescription surface may be a progressive or a non-progressive surface. In this context, the coordinates of the surface are to be understood especially as coordinates of the surface in the classical meaning as well as the points of the surface.

With the method of the invention, the following advantages can also be achieved without an additional online optimization of the perception surface:

adjustment of the required dioptric effect at two reference points,
fulfillment of the dioptric effect at a reference point and achieving only minor deviations in further points on the main viewing line of the perception surface,
correction of the adjustment astigmatism,
consideration of the Listing's Rule for distance and proximity,
correction of an individual near prescription, in particular amount and axial position of a near astigmatism (cf. e.g. "Bestimmen von Sehhilfen" by D. Methling, 2nd edition 1996, chapter 4.5 on page 117),
turning on/off or changing design refraction errors,
adjustment of DNEye® prescriptions, in particular of prescriptions in the calculation of which objective measurement data (such as e.g. measurement data obtained by means of wavefront measurement with an aberrometer, autorefractometer measurement or the like) are incorporated, in the distant reference point and in the near reference point,
conversion of lenses which have been optimized in the position of use into measuring position lenses and vice versa,
possibility of describing production corrections for the reference points of general freeform surfaces,
possibility of a different surface astigmatism, in particular a different axial position and/or a different amount of the astigmatism, in the distant and near range.

In this context, a prescription surface equation is to be understood as any type of equation which is suited to describe the prescription surface using a set of parameters, i.e. at least one parameter. According to the invention, the entire prescription surface can be described with a single prescription surface equation, the parameters of the prescription surface equation being preferably different at different coordinates of the prescription surface, wherein the parameters of the perception surface equation are changing in a controlled manner.

In this context, an interpolation is to be understood as any way of calculating further values at other coordinates on the basis of at least two predetermined values (here: first and second sets of parameters) at predetermined coordinates. In particular, the term interpolation is intended to include linear as well as non-linear interpolations. Also, the term interpolation is intended to include not only calculations of values between the two predetermined values, but also calculations of values beyond the predetermined values (what may also be referred to as extrapolation) and of values next to the direct connection line between the predetermined values.

Preferably, in step S40, the prescription surface values $z(u,v)$ in a u/v coordinate system can be determined by arrow heights of the prescription surface according to the following equation, according to which each meridional section is described by a circle:

$$z(u, v) = \frac{r^2 c}{1 + \sqrt{1 - r^2 c^2}}$$

with the meridional curvature $$c = c_u \cos^2 \alpha + c_v \sin^2 \alpha = c_u \frac{u^2}{r^2} + c_v \frac{v^2}{r^2}$$

and $r^2 = u^2 + v^2$.

The coordinates (u,v) are determined from the coordinates (x,y) and from the axial position $\alpha$ of the meridional section. Preferably, this u/v coordinate system is dependent on the orientation of the respective prescription surface equation. In the respective u/v coordinate system, the respective prescription surface equation can be specified particularly simply. The coordinate axes u and v are the directions of the main sections of the respective prescription surface equation. The origin of all u/v coordinate systems is always the same and coincides with the origin of the x/y coordinate system of the respective surface (front or back surface).

Preferably, the prescription surface equation can also be a toroidal equation or an equation of an analytically illustrable atoric surface, as indicated in e.g. EP 1 240 541 B1.

Preferably, in step S30, the interpolation of the further sets of parameters of the prescription surface equation can be performed in an x/y coordinate system which is rotated by a predetermined angle about a common z axis relative to the u/v coordinate system. Particularly preferably, in step S30, the interpolation of the further sets of parameters of the prescription surface equation can be performed in a parameter space of power vectors.

In a preferred configuration of the invention, in step S30, the interpolation of the further sets of parameters of the prescription surface equation can be performed in a power vector notation of the parameters.

Preferably, in step s30, the interpolation of the further sets of parameters of the prescription surface equation can be performed with the following power vector equation:

$$\vec{P}_c(x,y) = f(x,y)\vec{P}_{cF} + (1-f(x,y))\vec{P}_{cN}$$

wherein $P_c(x,y)$ represents a power vector at any coordinate (x,y), $P_{cF}$ represents a power vector calculated from the first set of parameters, $P_{cN}$ represents a power vector calculated from the second set of parameters, and $f(x,y)$ is a transfer function.

The transfer function $f(x,y)$ can preferably be a non-linear function, whose function values along the y-axis are in a range of values from 0 to 1.

The transfer function $f(x,y)$ can preferably be a double asymptotic function.

In a preferred configuration of the invention, the transfer function $f(x,y)$ can be given by $$f(x, y) = 0{,}5 + \frac{1}{\pi}\arctan\left(\frac{y - y_0}{y_s(x)}\right)$$

wherein $y_S$ is a scaling factor.

The scaling factor $y_S$ of the transfer function $f(x,y)$ can preferably be in a range of values from 4 mm to 15 mm.

In an embodiment of the invention, the scaling factor $y_S$ of the transfer function $f(x,y)$ can preferably be a scaling factor $y_S(x)$ depending from the x coordinate. In a preferred configuration of the invention, this scaling factor $y_S(x)$ of the transfer function $f(x,y)$ depending from the x coordinate can be given by $$y_S(x) y_{SRand} + (y_{SZentrum} - y_{SRand}) e^{-x^2/b}$$

with $$b = \frac{-(\Delta x)^2}{\ln(0,5)},$$

where $\Delta x$ is the full width at half maximum of the Gaussian curve.

In another preferred configuration, the transfer function has partial derivatives of x and y, which are equal to zero in the reference points. It is also advantageous if, in addition, the Hesse matrix of the transfer function with respect to x and y at the reference points is the zero matrix, i.e. if, in addition, the second partial derivatives of x and y as well as the mixed derivative of x and y are equal to zero. In this case, the curvature properties of the superimposed surface at the reference points can be read directly from the coefficients of the torus equation.

The invention also relates to a method for producing a multifocal lens having a front surface and a rear surface, wherein a design of a prescription surface is created according to a method of the invention described above.

The invention also relates to an apparatus for producing a multifocal lens having a front surface and a back surface, comprising means for creating a design of a prescription surface of the multifocal lens which is configured for the above-described creation of the design of the prescription surface of the invention.

The invention further relates to a computer program product or computer program which is configured to perform an above-described method of creating a design of a prescription surface of a multifocal lens of the invention, when loaded and executed on a computer.

The invention further relates to a storage medium having a computer program stored thereon, wherein the computer program is configured to perform an above-described method of creating a design of a prescription surface of a multifocal lens of the invention, when loaded and executed on a computer.

According to a further aspect of the invention, a multifocal lens has a back surface and a front surface, wherein a prescription surface of the multifocal lens comprises a first reference point at which at least one aberration of an eye of a proband is corrected for a first situation of use, and a second reference point at which at least one aberration of the eye of the proband is corrected for a second situation of use; and a design of the prescription surface is configured such that prescription surface values of the prescription surface at further coordinates of the prescription surface are determined via an interpolation of further sets of parameters of a predetermined prescription surface equation from a first set of parameters of the prescription surface equation at the first reference point and a second set of parameters of the prescription surface equation at the second reference point.

Preferably, the design of the prescription surface is created via a method of the invention described above.

The above and further advantages, features and possible applications of the invention will be better understood from the following description of exemplary embodiments with reference to the accompanying drawings, in which, to a large extent schematically:

FIGS. 8A-8C shows diagrams of an astigmatic defect and a refraction defect along a main viewing line (FIG. 8A), an astigmatic defect in the position of use (FIG. 8B), and a surface astigmatism of the rear surface (FIG. 8C) for an inventive multifocal lens according to configuration 3;

Figures 15A, 15B:
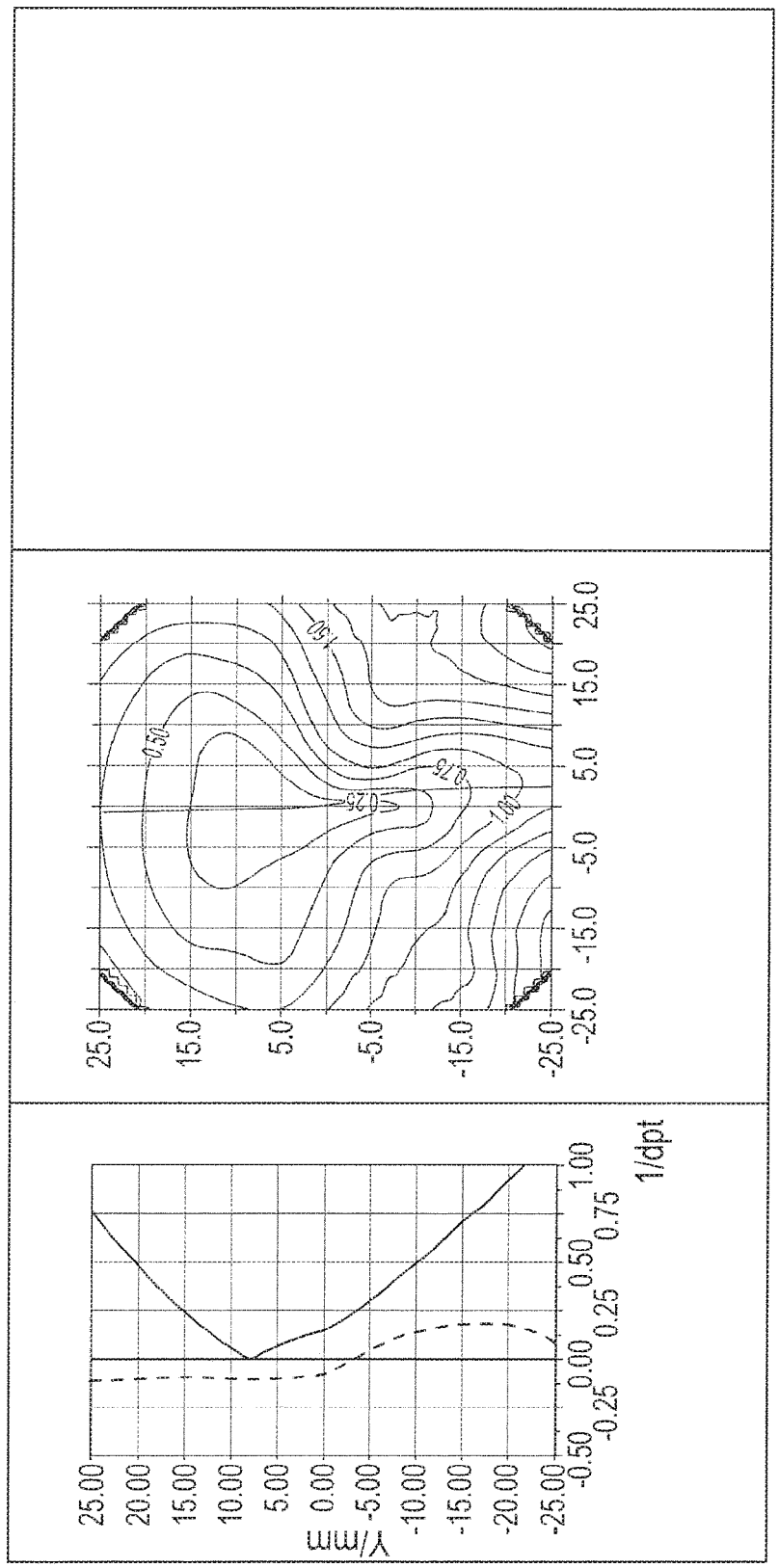

FIGS. 15A and 15B shows diagrams of an astigmatic defect and a refraction defect along a main viewing line (FIG. 15A), and an astigmatic defect in the position of use (FIG. 15B) for a conventional multifocal lens according to configuration 10; and FIGS. 16A-16C shows diagrams of an astigmatic defect and a refraction defect along a main viewing line (FIG. 16A), an astigmatic defect in the position of use (FIG. 16B), and a surface astigmatism of the rear surface (FIG. 16C) for an inventive multifocal lens according to configuration 11.

Figure 1:
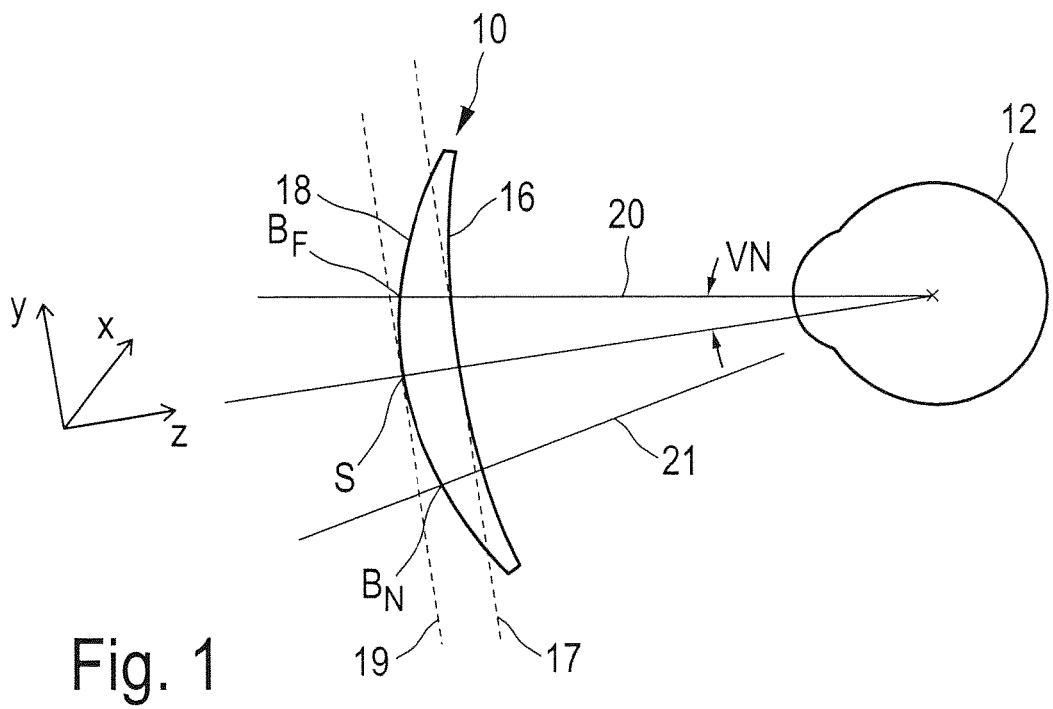
FIG. 1 shows a representation of a multifocal lens according to an embodiment of the invention in front of an eye of a spectacle wearer.

FIG. 1 shows a multifocal lens 10 of a progressive spectacle lens in front of an eye 12 of a proband or spectacles wearer. The multifocal lens 10 has a rear surface 16 facing towards the eye 12, and an opposite front surface 18 facing away from the eye. In FIG. 1, a base plane 17 of the rear surface 16 and a base plane 19 of the front surface 18 are shown. Typically, the base plane 19 of the front surface 18 forms or defines the coordinate system of the spectacle in which, for example, distant and near reference points are specified.

Also, an x/y/z coordinate system is exemplarily shown. In this, the x/y plane preferably forms the tangential plane to the front surface 19 at the vertex S. The front surface 18 and/or the rear surface 16 of the multifocal lens 10 can thus be described by means of surface values in the z-direction at the coordinates (x,y). Analogously, the rear surface 16 and the front surface 18 of the multifocal lens 10 can also be described by means of surface values in the z-direction at the coordinates (u,v) of an u/v/z coordinate system, which is rotated a predetermined angle about the z-axis with respect to the x/y/z coordinate system.

The spectacle lens 10 is preferably inclined with respect to the vertical by a forward inclination VN of, for example, about 8°, and the vertex S of the front surface 18 is preferably about 4 mm below the zero viewing direction 20. The zero viewing direction 20 penetrates the front surface 18 in the centering point $B_z$.

In the exemplary embodiment of FIG. 1, the front surface 18 of the multifocal lens 10 is exemplarily designed as a spherical surface, and the rear surface 18 forms the prescription surface which is optimally adjusted as described below. Alternatively, the prescription surface can also be the front surface 18, a superimposed surface of the front surface 18 or a superimposed surface of the rear surface 16. Further, the surface opposite the prescription surface can alternatively also be an aspherical, toric or atoric surface. In addition, the surface opposite the prescription surface can optionally be configured as a progressive or a non-progressive surface.

FIG. 1 also illustrates a first situation of use, in which the spectacle wearer directs his view far away essentially along the horizontal 20. The point at which the horizontal 20 intersects the front surface 18 is typically referred to as the centering point, which can be identical to the distant reference point $B_F$ (first reference point of the invention). Often, however, the distant reference point $B_F$ is positioned further up in the vertical direction in the distant area of the lens, e.g. at y=8 mm. Furthermore, FIG. 1 illustrates a second situation of use in which the spectacle wearer directs his view close-up along a near viewing direction 21. The point at which the near viewing direction 21 intersects the front surface 18 is referred to as the near reference point $B_N$ (second reference point of the invention). In the following, the index F refers in each case to the first situation of use or the distant reference point $B_F$, and the index N refers to the second situation of use or the near reference point $B_N$.

The multifocal lens 10 of the present invention is distinguished by the fact that it can be calculated both at the distant reference point $B_F$ and at the near reference point $B_N$ in such a way that it can correct the aberrations of the eye 12 of the spectacle wearer in both the first and second situations of use simultaneously. In addition, the prescription surface is configured such that a continuous transition of the prescription surface between the two reference points $B_F$, $B_N$ can be achieved.

Referring to FIGS. 2 to 5, a method for creating an improved design of the prescription surface of the multifocal lens 10 according to an exemplary embodiment of the invention is now explained in more detail. Preferably, the use of an iterative optimization method is not necessary. Preferably, the method is carried out in a computer-implemented way.

Figure 2:
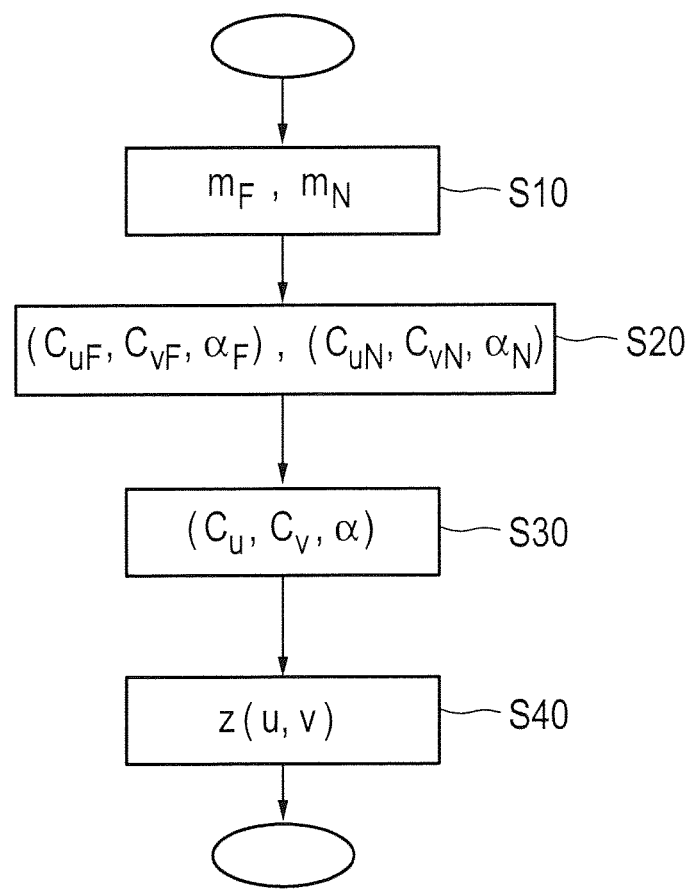
FIG. 2 shows a simplified flowchart for explaining a method for creating a design of a prescription surface of a multifocal lens according to an embodiment of the invention.

As shown in FIG. 2, in a first step S10, first data $m_F$ are provided by, for example, an optician or an ophthalmologist for describing an aberration of the eye 12 of the spectacle wearer for the first situation of use. The first data $m_F$ are preferably measurement data which are measured directly by the optician or ophthalmologist. Further, second data $m_N$ are provided for describing an aberration of the eye 12 for the second situation of use. The second data $m_N$ can also be directly measured by the optician or ophthalmologist. Alternatively, one or more of the second data $m_N$ can be obtained by calculation from data measured or determined by the optician or ophthalmologist, for example from the addition. The calculation of the second data $m_N$ from the measured data/values can in particular be carried out on a model of the eye based on the so-called Listing Rule (in particular for proximity) describing the orientation of the eye as a function of the vergence position of the eyes. The first and second data $m_F$, $m_N$ are subjectively obtained for example with the aid of test lenses (subjective refraction) and supplied as a prescription consisting of sphere, cylinder and axis (SZA). Alternatively, an aberration of a wavefront of the eye can also be detected by means of suitable measuring instruments, thus determining an objective refraction. These can also be combined with the subjective refraction.

In a second method step S20, a first set of parameters ($c_{uF}$, $c_{vF}$, $\alpha_F$) of a prescription surface equation describing the prescription surface at the first reference point $B_F$ and a second set of parameters ($c_{uN}$, $c_{vN}$, $\alpha_N$) of the prescription surface equation at the second reference point $B_N$ are determined from the first and the second data $m_F$, $m_N$.

This determination of the sets of parameters from the data can, for example, be performed as follows.

The calculation is preferably carried out using a zero-point method, e.g. a single Newton iteration in six dimensions, the six independent variables being the sets of parameters ($c_{uF}$, $c_{vF}$, $\alpha_F$) and ($c_{uN}$, $c_{vN}$, $\alpha_N$).

In the reference points $B_F$ and $B_N$, the actual values of the spectacle lens at the vertex ball are calculated with the given sets of parameters ($c_{uF}$, $c_{vF}$, $\alpha_F$), ($c_{uN}$, $c_{vN}$, $\alpha_N$) using known ray and wavetracing methods, and the spectacle lens values $S_{BF}$ (sphere at the reference point $B_F$), $Z_{BF}$ (cylinder at the reference point $B_F$), $A_{BF}$ (axis at the reference point $B_F$), $S_{BN}$ (sphere at the reference point $B_N$), $Z_{BN}$ (cylinder at the reference point $B_N$), and $A_{BN}$ (axis at the reference point $B_N$) are obtained.

The comparison of these actual values with the setpoint values (=prescription values $S_F$, $Z_F$, $A_F$ for $B_F$ and $S_N$, $Z_N$, $A_N$ for $B_N$) then gives the dependent variables for the Newton method:

$$\Delta S_F = S_{BF} - S_F, \quad \Delta Z_F = Z_{BF} - Z_F, \quad \Delta A_F = A_{BF} - A_F$$

$$\Delta S_N = S_{BN} - S_N, \quad \Delta Z_N = Z_{BN} - Z_N, \quad \Delta A_N = A_{BN} - A_N$$

The Newton iteration, according to experience, leads very quickly to the desired result. Of course, the surface parameters and the mapping properties for the zero-point method may also be formulated in the power vector notation, or a different zero-point method can be used.

As is known, an arrow height z(u,v) (prescription surface value of the invention in the u/v coordinate system at a point or at the coordinates is determined at a point or at coordinates (u,v) of the prescription surface, where u is the direction of the first main section and v is the direction of the second main section of the prescription) is determined according to the following equation, according to which each meridional section is specified as a circle:

$$z(u,v) = \frac{r^2 c}{1 + \sqrt{1 - r^2 c^2}}$$

with the meridional curvature $$c = c_u \cos^2\alpha + c_v \sin^2\alpha = c_u \frac{u^2}{r^2} + c_v \frac{v^2}{r^2}$$

and $r^2 = u^2 + v^2$.

The prescription surface has the three degrees of freedom $c_u$, $c_v$, $\alpha$ (set of parameters). Consequently, with this surface approach, exactly three conditions can be fulfilled, and the prescription $SZA_F$ in the distant reference point $B_F$ or the prescription $SZA_N$ in the near reference point $B_N$ can be set. However, a direct transfer of the arrow heights z(u,v) of the prescription surface thus determined, for example as a function of the y-coordinate, generally does not lead to a satisfactory result.

However, this problem can be solved according to the invention by a generalization of the surface approach torus with meridional circles on x- and y-dependent main curvatures and main curvature directions. The invention is based on the following considerations.

The parameters ($c_u$,$c_v$,$\alpha$) of a torus are not given directly by the prescription to be achieved, but these are the parameters of the torus at the vertex at which the torus touches the spectacle lens. The torus thus defined now gives rise to a change in the arrow height, the prism and the curving properties at a desired point, for example the reference points $B_F$ and $B_N$. In particular, the properties of use of the lens in the desired point depend uniquely on ($c_u$,$c_v$,$\alpha$). Those values which lead to a desired correction in $B_F$ are the first set of parameters ($c_{uF}$,$c_{vF}$,$\alpha_F$), and the corresponding values for the correction in $B_N$ are the second set of parameters ($c_{uN}$,$c_{vN}$,$\alpha_N$).

The values ($c_u$,$c_v$,$\alpha$) of the two toric surfaces for correction in the reference points $B_F$ and $B_N$ are transferred to one another in such a way that a smooth surface which is easy to describe and which adjusts the required target effects in the two reference points $B_F$ and $B_N$. In particular, in a method step S30, further sets of parameters ($c_u$,$c_v$,$\alpha$) of the prescription surface equation at further coordinates (u,v) of the prescription surface are determined from the first set of parameters ($c_{uF}$,$c_{vF}$,$\alpha_F$) and the second set of parameters ($c_{uN}$, $c_{vN}$, $\alpha_N$).

A preferred interpolation method for performing method step S30 is explained with reference to FIG. 3 in more detail.

Figure 3:
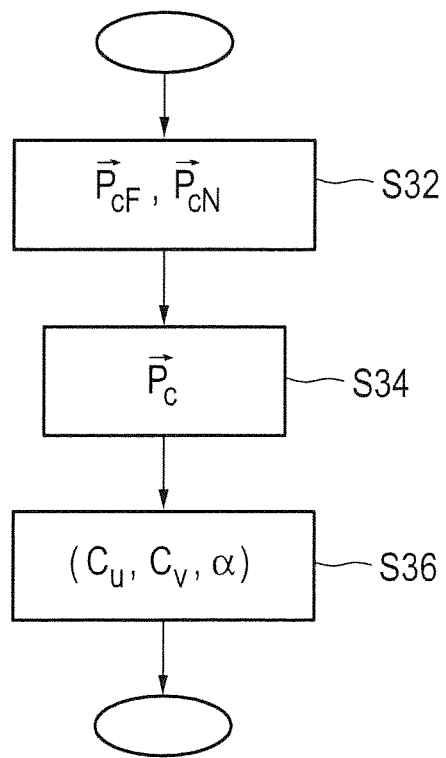
FIG. 3 shows a simplified flowchart for explaining a step of interpolation in the method of FIG. 2, according to an embodiment of the invention.

In the interpolation method of FIG. 3, the so-called power vector notation is used. In a step S32, the first set of parameters ($c_{uF}$,$c_{vF}$,$\alpha_F$) and the second set of parameters ($c_{uN}$,$c_{vN}$,$\alpha_N$) are converted into power vectors according to the following equations:

$$\vec{P}_{cF} = \begin{pmatrix} M_F \\ J_{0F} \\ J_{45F} \end{pmatrix} = \begin{pmatrix} 0,5(c_{uF} + c_{vF}) \\ -0,5(c_{vF} - c_{uF})\cos(2\alpha_F) \\ -0,5(c_{vF} - c_{uF})\sin(2\alpha_F) \end{pmatrix} \text{ and}$$

$$\vec{P}_{cN} = \begin{pmatrix} M_N \\ J_{0N} \\ J_{45N} \end{pmatrix} = \begin{pmatrix} 0,5(c_{uN} + c_{vN}) \\ -0,5(c_{vN} - c_{uN})\cos(2\alpha_N) \\ -0,5(c_{vN} - c_{uN})\sin(2\alpha_N) \end{pmatrix}$$

In step S34, an interpolation between these two power vectors $\vec{P}_{cF}$ and $\vec{P}_{cN}$ is carried out. Preferably, this interpolation is carried out in the parameter space of the power vectors. The selected parameter space of the curvature power vectors is particularly advantageous because the parameters substantially directly describe the curving properties of the lens. Thus, the transition of the curvatures from the distant reference point $B_F$ to the near reference point $B_N$ can be done in a simple manner and in a particularly direct manner. This is in particular the case when the transfer function has partial derivatives of x and y, which are zero in the reference points $B_F$, $B_N$, and comprises a Hesse matrix which is the zero-matrix with respect to x and y at the reference points $B_N$ and $B_F$, i.e. if additionally the second partial derivatives of x and y as well as the mixed derivative of x and y are equal to zero. In this case, the curvature properties of the superimposed surface at the reference points are advantageously directly obtainable at the coefficients of the prescription surface equation.

In this embodiment, the interpolation in step S34 is carried out using a transfer function $f(x,y)$ via the following power vector equation:

$$\vec{P}_c(x,y) = f(x,y)\vec{P}_{cF} + (1 - f(x,y))\vec{P}_{cN}$$

For each transfer function $f(x,y)$ given, six free parameters ($c_{uF}$, $c_{vF}$, $\alpha_F$, $c_{uN}$, $c_{vN}$, $\alpha_N$) are available in the above power vector equation with the first and second sets of parameters. If a full correction is required in both reference points $B_F$ and $B_N$, this also means six conditions so that the six parameters can be determined numerically definitely. As an alternative, with this approach, one can even demand conditions at more than two points. However, the problem is then overdetermined with more than six conditions for six free parameters so that it can no longer be solved definitely. If, however, no zero-point method is used, but more generally a minimization method, an optimum can be found numerically, preferably by assigning weights to the conditions, which is close to all conditions.

The transfer function $f(x,y)$ is given, for example, by the following equation:

$$f(x,y) = 0,5 + \frac{1}{\pi}\arctan\left(\frac{y - y_0}{y_S}\right)$$

where $y_S$ is a scaling factor.

Figure 5:
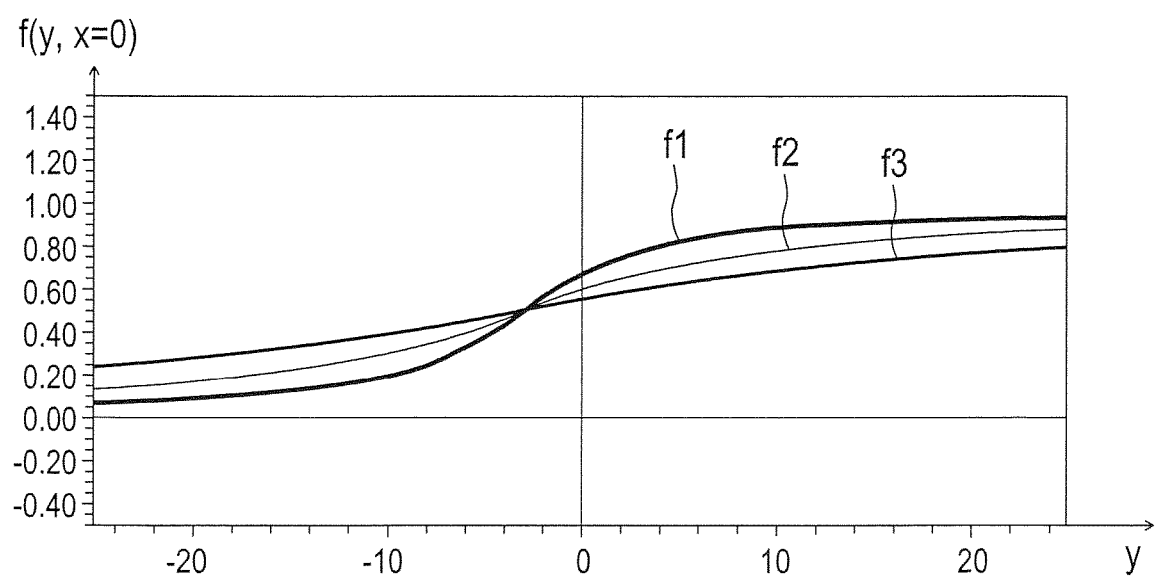
FIG. 5 shows a diagram illustrating a course of a transfer function along the x-axis, which may be used in the step of interpolation of FIG. 3, according to an embodiment of the invention.

FIG. 5 illustrates the course of this transfer function along the y-axis direction for x=0, i.e. of the transfer function $$f(y, x=0) = 0,5 + \frac{1}{\pi}\arctan\left(\frac{y - y_0}{|y_S(x=0)|}\right),$$

for different scaling factors $y_S$. In particular, the curve f1 illustrates the transfer function $f(y,x=0)$ for $y_S=5$ mm, the curve f2 illustrates the transfer function $f(y,x=0)$ for $y_S=15$ mm, and the curve f3 illustrates the transfer function $f(y,x=0)$ for $y_S=20$ mm.

As can be seen from the above functional equation and FIG. 5, the transfer function $f(x,y)$ is in particular a non-linear function whose function values along the y-axis $f(x=0,y)$ are in a range of values from 0 to 1 for $-\infty<y<+\infty$, and a double asymptotic function. The increase of the arctan function is controlled by the scaling factor $y_S$. The smaller $y_S$, the steeper the transfer function is in the center $y_0$, and the faster the transition from the distant to the near values takes place.

For the vertical transition of the power vector $\vec{P}_c$ along the y-axis (x=0 mm), values of $$y_0 \approx \frac{y_{BF} + y_{BN}}{2}$$

and 4 mm$\leq y_S \leq$15 mm lead to good results.

Further, exemplary calculations have shown that with a factor $f(y)$ depending on the y-coordinate only, higher surface gradients can occur in the peripheral transition zone, which may sometimes worsen the imaging properties. A relief is possible for example when using a scaling factor $y_S(x)$ being dependent on the x-coordinate. In one configuration of the invention, the scaling factor $y_S(x)$ of the transfer function $f(x,y)$, which is dependent on the x-coordinate, is given by, for example, $$y_S(x) = y_{SRand} + (y_{SZentrum} - y_{SRand})e^{-\frac{x^2}{b}}$$

with $$b = \frac{-(\Delta x)^2}{\ln(0,5)},$$

where $\Delta x$ is the full width at half maximum of the Gaussian curve (for $\Delta x=13$ mm this leads for example to b=243.82).

After the interpolation of the power vectors thus performed in step S34, in a next step S36, the interpolated power vectors $\vec{P}_c$ are back-transferred to the sets of parameters ($c_u, c_v, \alpha$) via the following relations:

$$\vec{P}_c(x,y) = \begin{pmatrix} M \\ J_0 \\ J_{45} \end{pmatrix}, c_x = M + \sqrt{J_0^2 + J_{45}^2},$$

$$c_y = c_x - 2\sqrt{J_0^2 + J_{45}^2}, \alpha = \frac{1}{2}\arctan(-J_0, -J_{45}) + \frac{\pi}{2}$$

Referring again to FIG. 2, in step S40, the arrow heights z(u,v) of the prescription area are determined at the first reference point $B_F$ on the basis of the first set of parameters ($c_{uF}, c_{vF}, \alpha_F$) and at the second reference point $B_N$ on the basis of the second set of parameters ($c_{uN}, c_{vN}, \alpha_N$) by the following relations:

$$\text{meridional curvature: } c = c_u \cos^2\alpha + c_v \sin^2\alpha = c_u \frac{u^2}{r^2} + c_v \frac{v^2}{r^2}$$

$$\text{arrow height } z(u,v) = \frac{r^2 c}{1 + \sqrt{1 - r^2 c^2}}$$

In addition, in step S40, also the arrow heights z(u,v) at further coordinates (u,v) of the prescription surface are determined on the basis of the interpolated sets of parameters after a rotation into the u/v coordinate system according to $$u = x\cos(\alpha) + y\sin(\alpha), v = -x\sin(\alpha) + y\cos(\alpha), r^2 = u^2 + v^2$$

Figure 4:
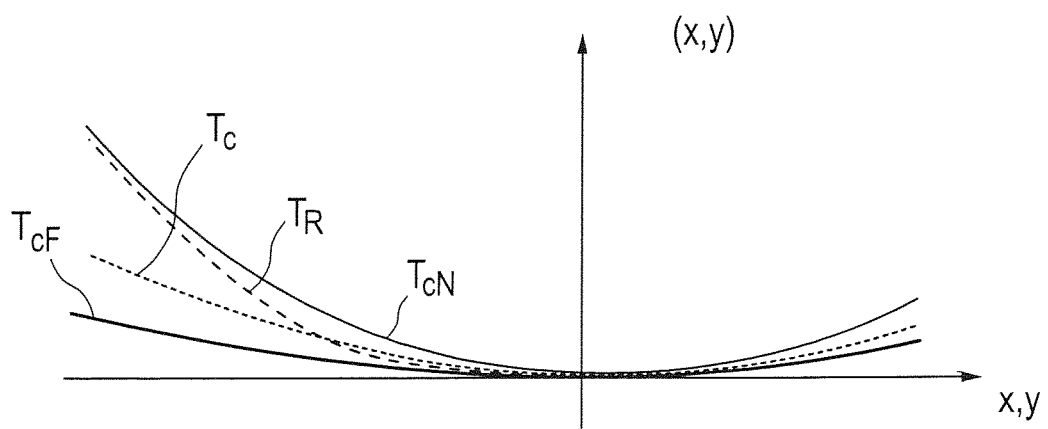
FIG. 4 shows a diagram for explaining the functionality of the step of interpolation of FIG. 3.

For a further illustration of the interpolation method of the invention, FIG. 4 shows, by way of example, a prescription surface $T_R$ (dashed line, for example in the form of a superimposed surface) which represents a smooth transition between the torus $T_{cF}$ at the first reference point $B_F$ and the torus $T_{cN}$ at the second reference point $B_N$. The prescription surface $T_R$ adaptes to the torus at the second reference point $T_{cN}$ where the transfer function $f(x,y)$ is small, and to the torus at the first reference point $T_{cF}$ where the transfer function $f(x,y)$ is large. The arrow heights of the prescription surface $T_R$ at further points (x,y) of the coordinate system are calculated by further tori $T_c$ (dotted line), whose vertices are interpolated as described above in the power vector space.

Figures 6A, 6B, 6C:
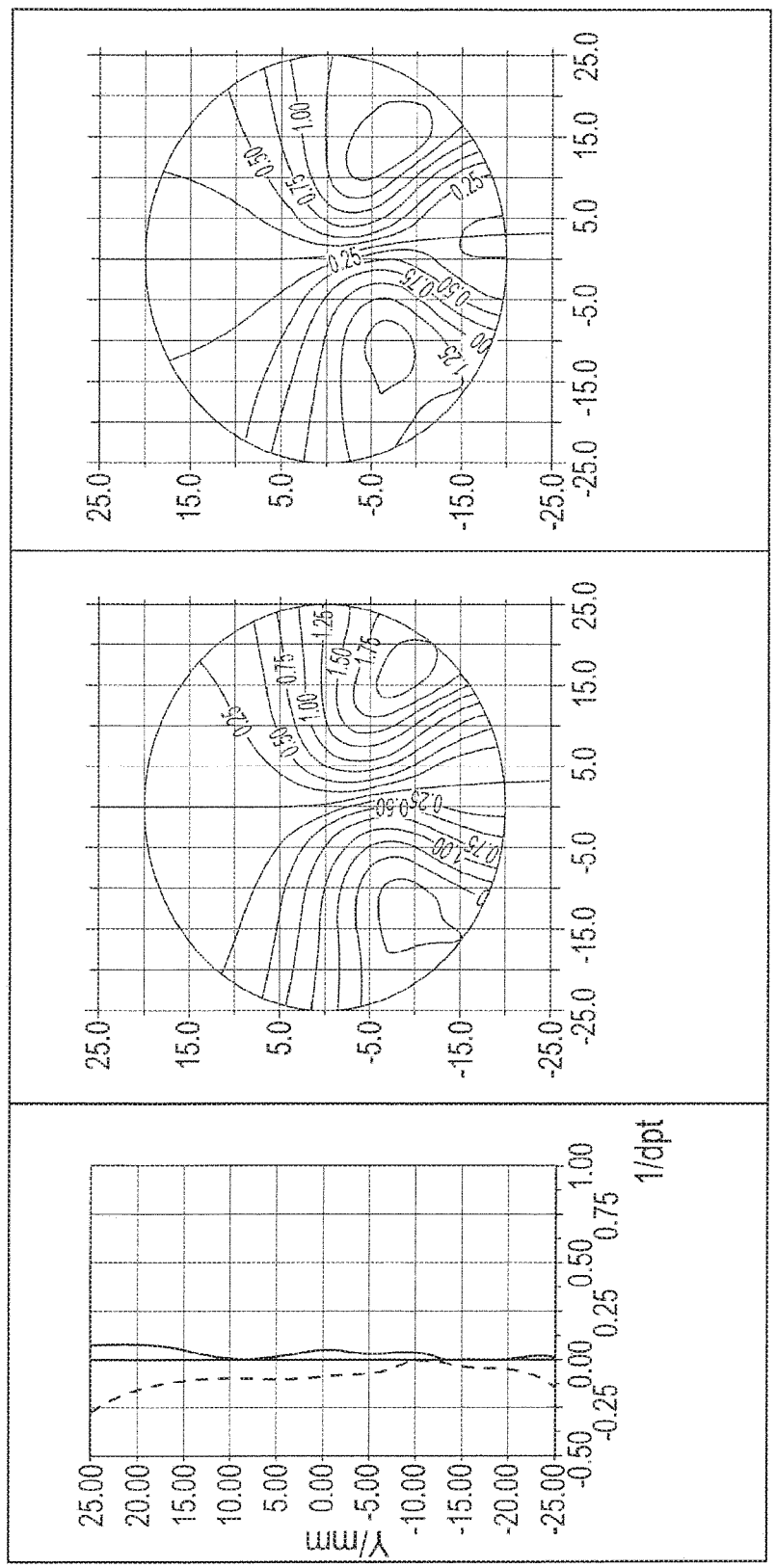
FIGS. 6A-6C show diagrams of an astigmatic defect and a refraction defect along a main viewing line (FIG. 6A), an astigmatic defect in the position of use (FIG. 6B), and a surface astigmatism of the rear surface (FIG. 6C) for a conventional multifocal lens according to configuration 1.

The advantageous effects of the above-described method for creating the design of the prescription surface or of the multifocal lens produced in this way are explained below with reference to FIGS. 6A-6C to 16A-16C. In each case, FIG. 6A shows an astigmatic defect (solid line) and a refraction defect (dashed line) along the main viewing line, FIG. 6B shows an astigmatic defect in the position of use, and FIG. 6C shows a surface astigmatism of the rear surface.

The configurations 1 to 3 shown in FIGS. 6A-6C to 8A-8C each relate to a multifocal lens having a spherical front surface and a rear surface in modern free-form technology, in particular a Progressive Life Free® progressive spectacle lens of the applicant.

The conventional multifocal lens according to configuration 1 represents a prefabricated blank of the type Progressive Life Free 1.6 having the prescription Sph 3.0 dpt and addition 1.5 dpt. The spherical front surface has the basic curve BK 6.0 dpt and has a surface refraction power of $D_1=6.82$ dpt on the front surface. The multifocal lens also has a refractive index n=1.597 and a center thickness $d_M=3.8$ mm. The progressive rear surface is optimized in the position of use with the standard parameters corneal vertex distance HSH=15 mm, forward inclination VN=8° and frame wrap angle FSW=0°. As can be seen from FIGS. 6A-6C, this conventional multifocal lens has good and balanced imaging characteristics.

The conventional multifocal lens of configuration 2 is based on the blank of configuration 1, has the same prescription as configuration 1, but different parameters for the position of use (HSA=12 mm, VN=2°, FSW=4°). For adjustment of a full correction at the distant reference point $B_F$, a superposition torus is formed on the progressive rear surface of the blank in order to form the prescription surface.

Figures 7A, 7B, 7C:
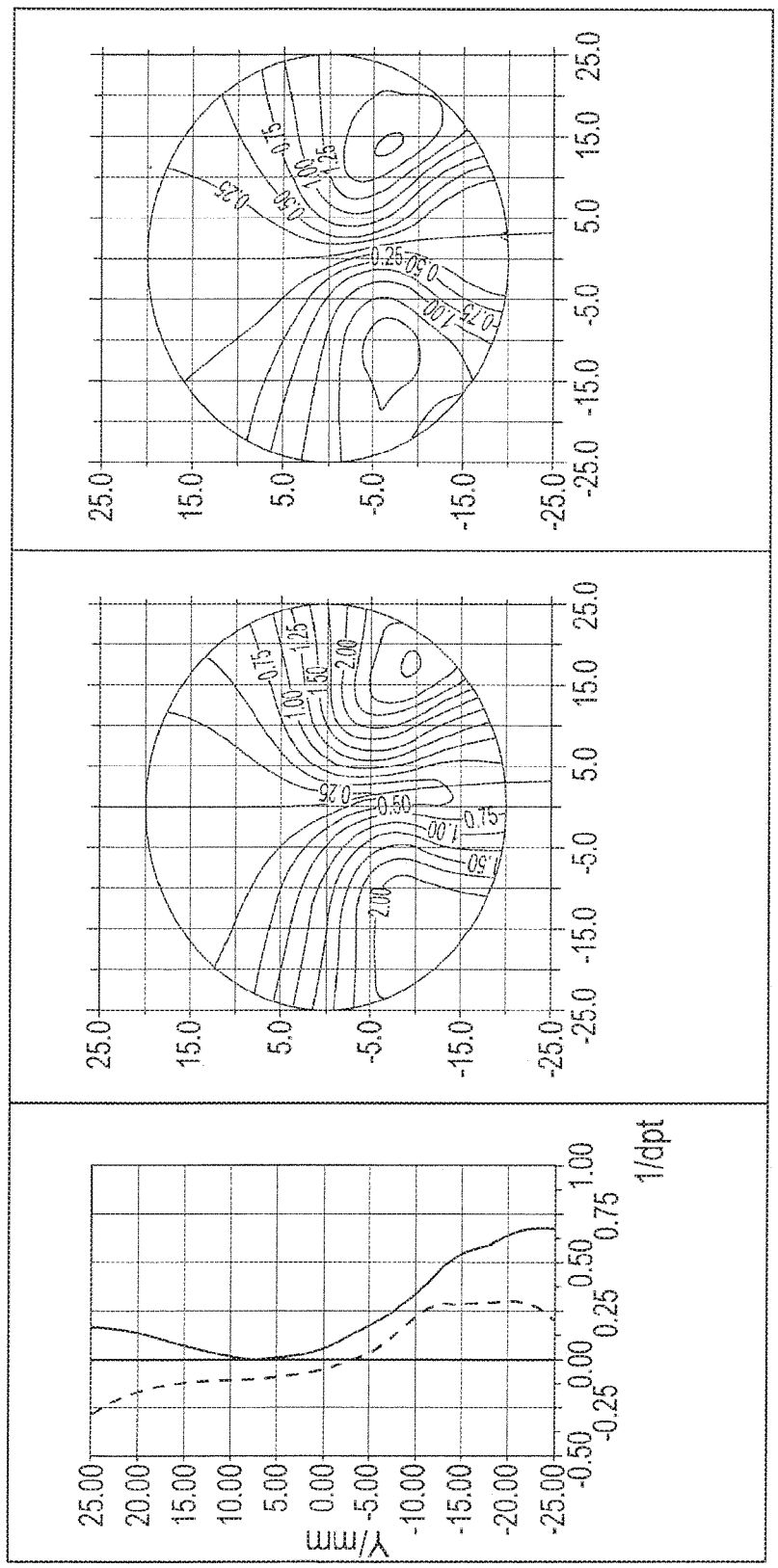
FIGS. 7A-7C show diagrams of an astigmatic defect and a refraction defect along a main viewing line (FIG. 7A), an astigmatic defect in the position of use (FIG. 7B), and a surface astigmatism of the rear surface (FIG. 7C) for a conventional multifocal lens according to configuration 2.
Figures 9A, 9B, 9C:
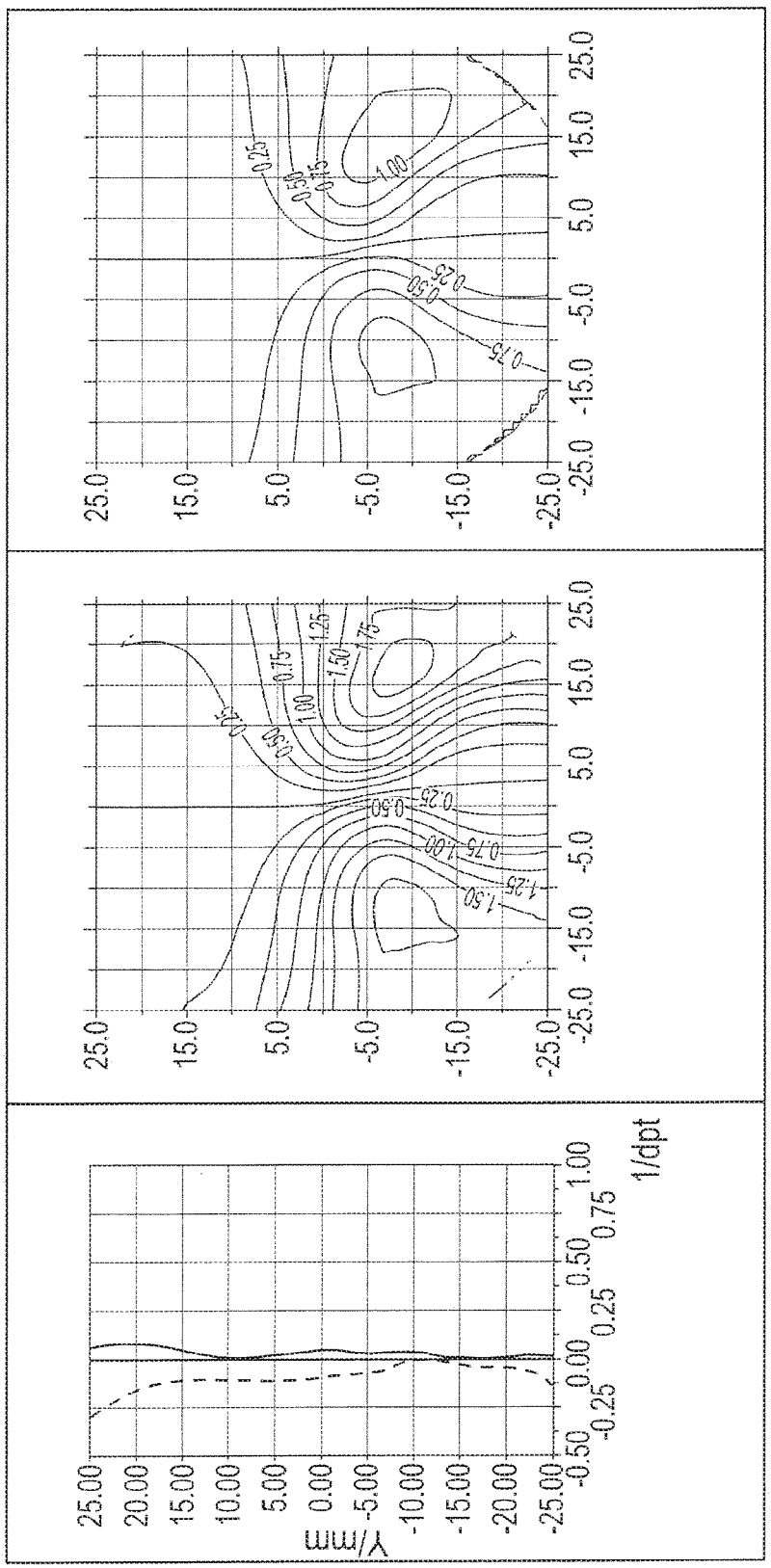
FIGS. 9A-9C shows diagrams of an astigmatic defect and a refraction defect along a main viewing line (FIG. 9A), an astigmatic defect in the position of use (FIG. 9B), and a surface astigmatism of the rear surface (FIG. 9C) for a conventional multifocal lens according to configuration 4.

It can be seen from the illustrations in FIGS. 7A-7C that, when the progressive spectacle lens is used in a frame which leads to slightly modified parameters for the position of use, the imaging characteristics may be significantly worsened, especially in the near area, even if the changed parameters for the position of use are considered by a superposition torus on the progressive rear surface for $B_F$. Even at a height of $y_{BN}=-14$ mm, the astigmatic defect in the near area increases to no longer tolerable values of 0.5 dpt (cf. FIG. 7B), and also the addition increases by 0.25 dpt (positive refraction defect of about 0.25 dpt in the near area, cf. FIG. 7A).

The multifocal lens of configuration 3 according to the invention is also based on the blank according to configuration 1. It has the same prescription as configuration 1 and the same parameters for the position of use as configuration 2. In contrast to configuration 2, however, in configuration 3 of the invention, an interpolating superimposed torus is formed on the progressive rear surface in order to adjust the full correction with the new parameters for the position of use not only at the distant reference point $B_F$ but also at the near reference point $B_N$.

As can be seen in FIGS. 8A-8C, with the prescription surface designed according to the invention, full correction can also be adjusted at the near reference point $B_N$ without resulting in a deterioration in the distant area. The rear surface now exhibits a surface astigmatism greater than 0.5 dpt in the near area (cf. FIG. 8C), which is introduced for defect correction by the new surface type.

The configurations 4 to 8 shown in FIGS. 9A to 9C to 13 likewise each relate to a multifocal lens having a spherical front surface and a rear surface in a modern free-form technology, in particular a Progressive Life Free® progressive spectacle lens from the applicant.

The conventional multifocal lens according to configuration 4 represents a prefabricated blank of the type Progressive Life Free 1.6 with the prescription Sph 0.5 dpt and addition 1.0 dpt. The spherical front surface has BK 5.0 and $D_1=5.686$ dpt. Further, the lens has a refractive index $n=1.597$ and a center thickness $d_M=2.0$ mm. The progressive rear surface is optimized in the position of use with the standard parameters HSA=15 mm, VN=8° and FSW=0°. As can be seen from FIGS. 9A-9C, this conventional blank also exhibits good and balanced imaging characteristics due to the progressive rear surface optimized for this purpose.

The conventional multifocal lens of configuration 5 is based on the blank of configuration 4, has the same prescription as configuration 4, but different parameters for the position of use (HSA=12 mm, VN=0°, FSW=10°). For adjusting the full correction at the distant reference point $B_F$, a superimposition torus is formed on the progressive rear surface of the blank.

Figures 10A, 10B, 10C:
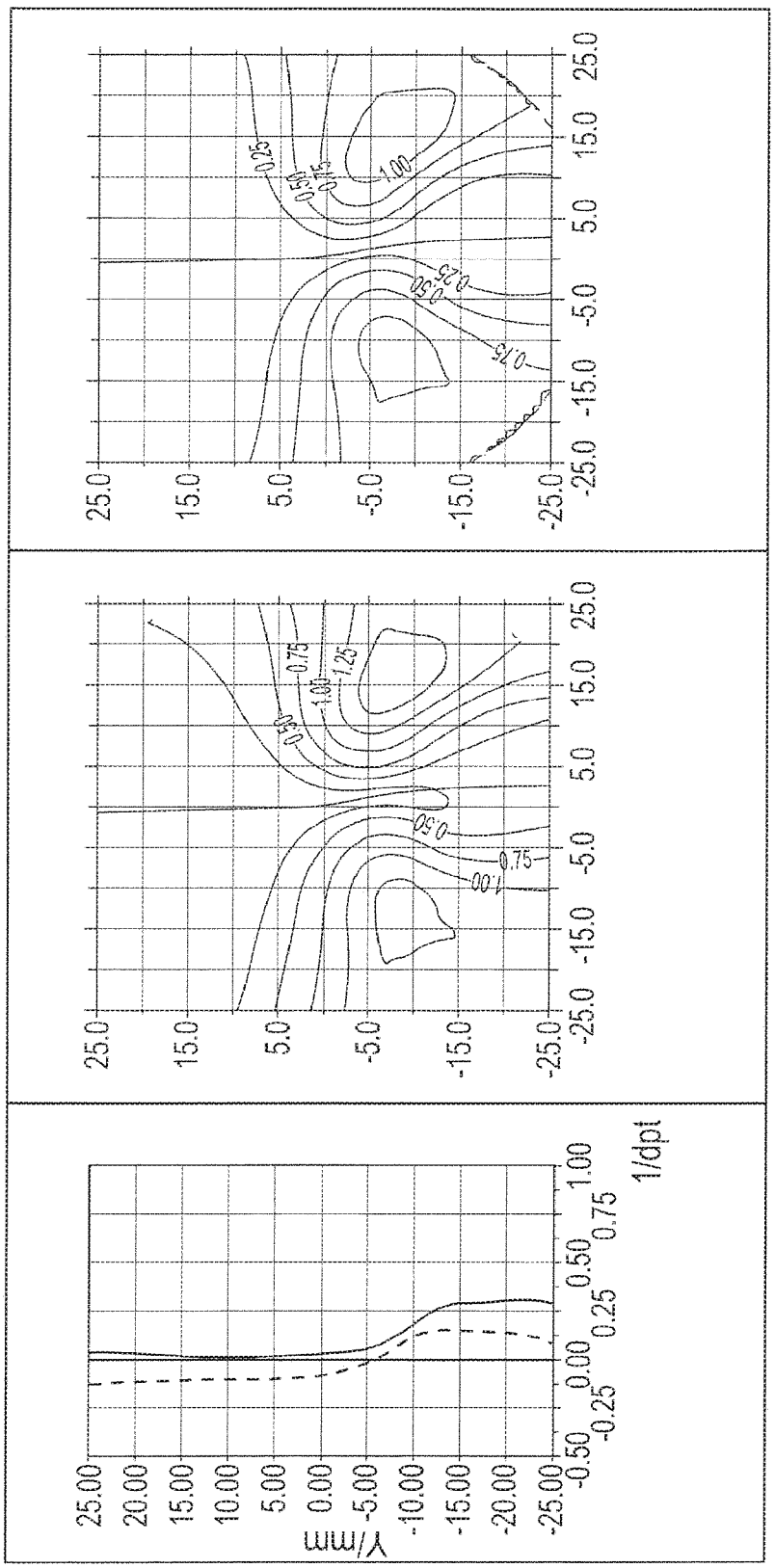
FIGS. 10A-10C shows diagrams of an astigmatic defect and a refraction defect along a main viewing line (FIG. 10A), an astigmatic defect in the position of use (FIG. 10B), and a surface astigmatism of the rear surface (FIG. 10C) for a conventional multifocal lens according to configuration 5.

As can be seen from FIGS. 10A-10C, however, the superimposition torus can only correct the already small deviations at the distant reference point $B_F$. The progressively toric rear surface differs little from the basic rear surface of configuration 4. In the near area, an astigmatic defect of about 0.25 dpt (cf. FIG. 10B) and a refraction defect about half as large (cf. FIG. 10A) arise.

The multifocal lens of configuration 6 according to the invention is also based on the blank according to configuration 4. It has the same prescription as configuration 4 and the same parameters for the position of use as configuration 5. In contrast to configuration 5, in configuration 6 of the invention, however, an interpolating superimposition torus is formed on the progressive rear surface in order to adjust the full correction with the new parameters for the position of use not only at the distant reference point $B_F$, but also at the near reference point $B_N$.

Figures 11A, 11B, 11C:
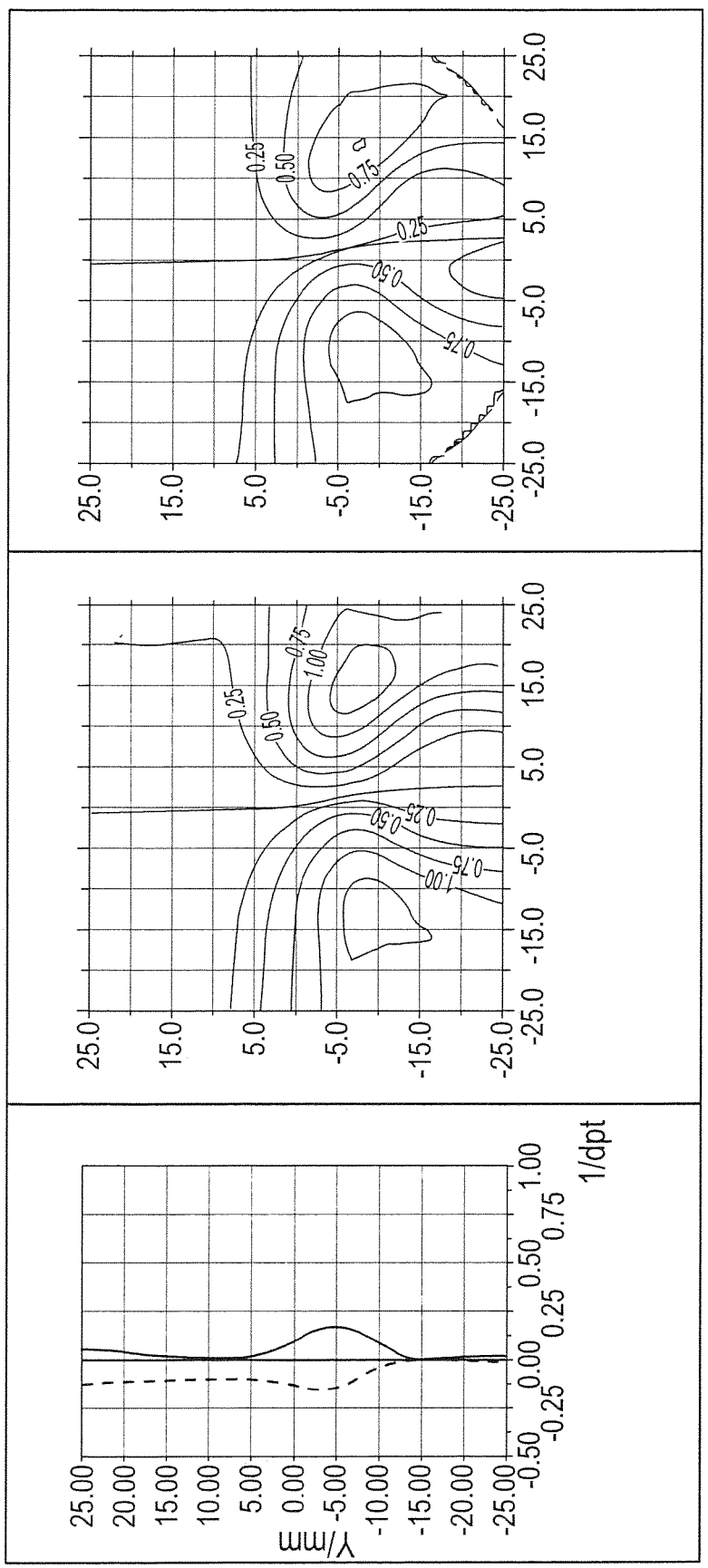
FIGS. 11A-11C shows diagrams of an astigmatic defect and a refraction defect along a main viewing line (FIG. 11A), an astigmatic defect in the position of use (FIG. 11B), and a surface astigmatism of the rear surface (FIG. 11C) for an inventive multifocal lens according to configuration 6.

As can be seen from FIGS. 11A-11C, with the inventive prescription surface, full correction can also be set at the near reference point $B_N$ without resulting in a deterioration in the distant area. The rear surface now exhibits a surface astigmatism of about 0.25 dpt in the near area (cf. FIG. 11C) which is introduced for error correction by the new surface type.

The conventional multifocal lens of configuration 7 is again based on the blank of configuration 4. It has the same distant prescription and the same parameters for position of use as configuration 4 but a near astigmatism of 0.5 dpt A 0°.

Figures 12A, 12B, 12C:
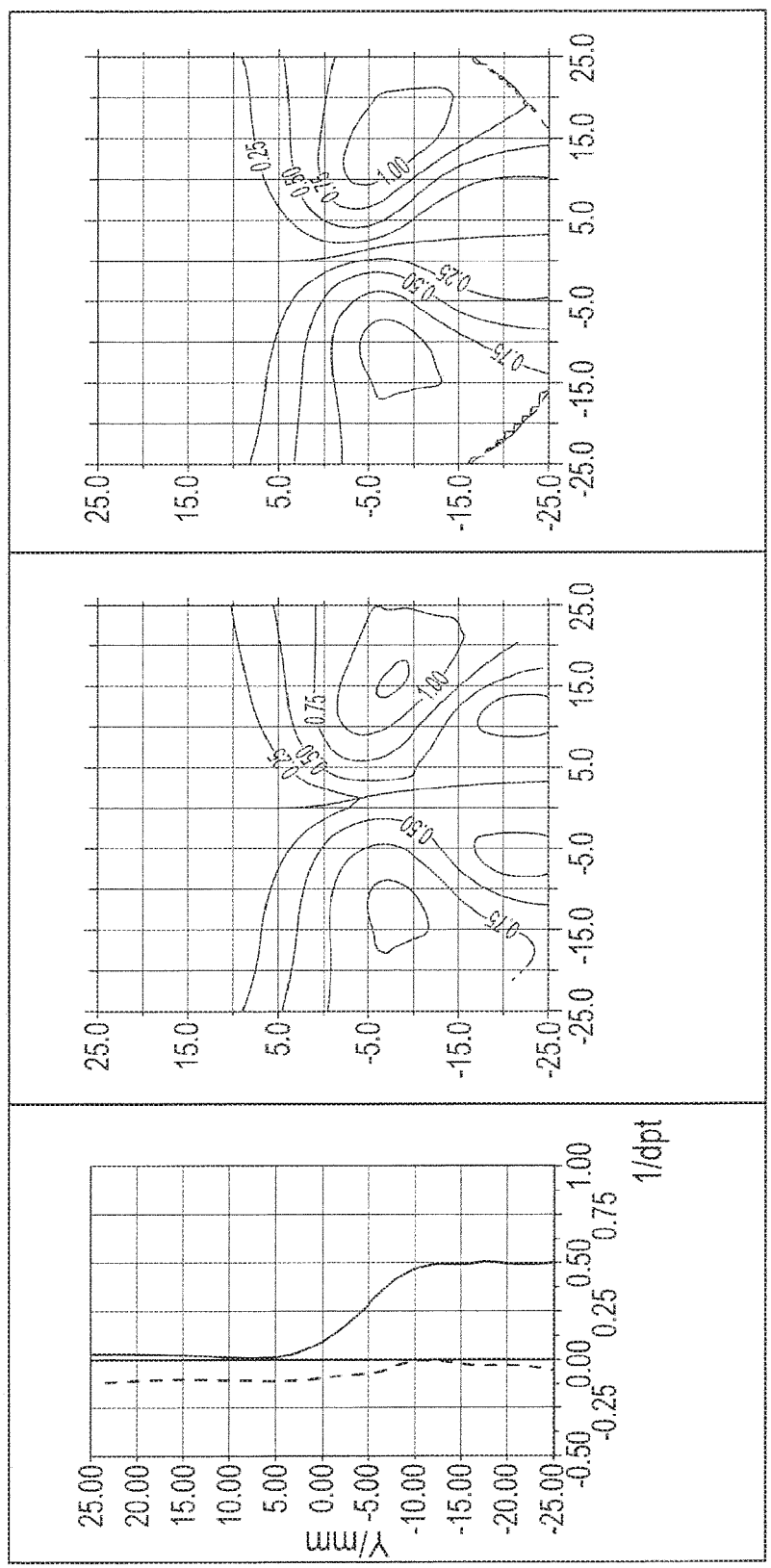
FIGS. 12A-12C shows diagrams of an astigmatic defect and a refraction defect along a main viewing line (FIG. 12A), an astigmatic defect in the position of use (FIG. 11B), and a surface astigmatism of the rear surface (FIG. 11C) for a conventional multifocal lens according to configuration 7.

As can be seen from FIGS. 12A-12C, the conventional progressive rear surface cannot correct the near astigmatism. The near astigmatism of the eye is presented 1: 1 as an astigmatic defect in the near area of the lens (cf. FIG. 12B). According to the state of the art, an individual online optimization of the rear surface should now take place.

The multifocal lens of configuration 8 according to the invention is again based on the blank according to configuration 4. It has the same prescription and the same parameters for position of use as configuration 5. In contrast to the conventional configuration 7, in configuration 8 of the invention, an interpolating superimposition torus is formed on the progressive rear surface to set the full correction for an individual near astigmatism of 0.5 dpt both at the distant reference point $B_F$ and the near reference point $B_N$.

Figures 13A, 13B, 13C:
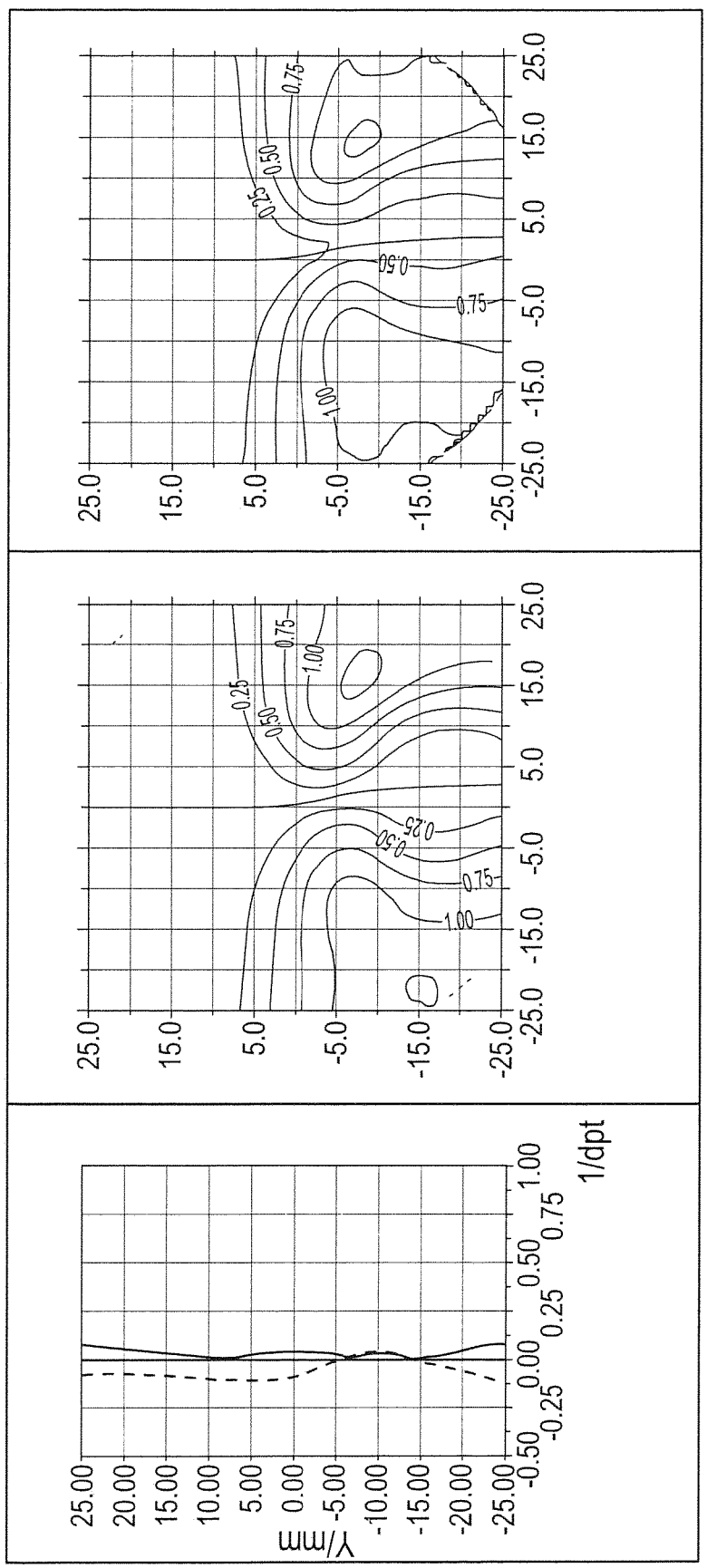
FIGS. 13A-13C shows diagrams of an astigmatic defect and a refraction defect along a main viewing line (FIG. 13A), an astigmatic defect in the position of use (FIG. 13B), and a surface astigmatism of the rear surface (FIG. 13C) for an inventive multifocal lens according to configuration 8.
Figures 14A, 14B:
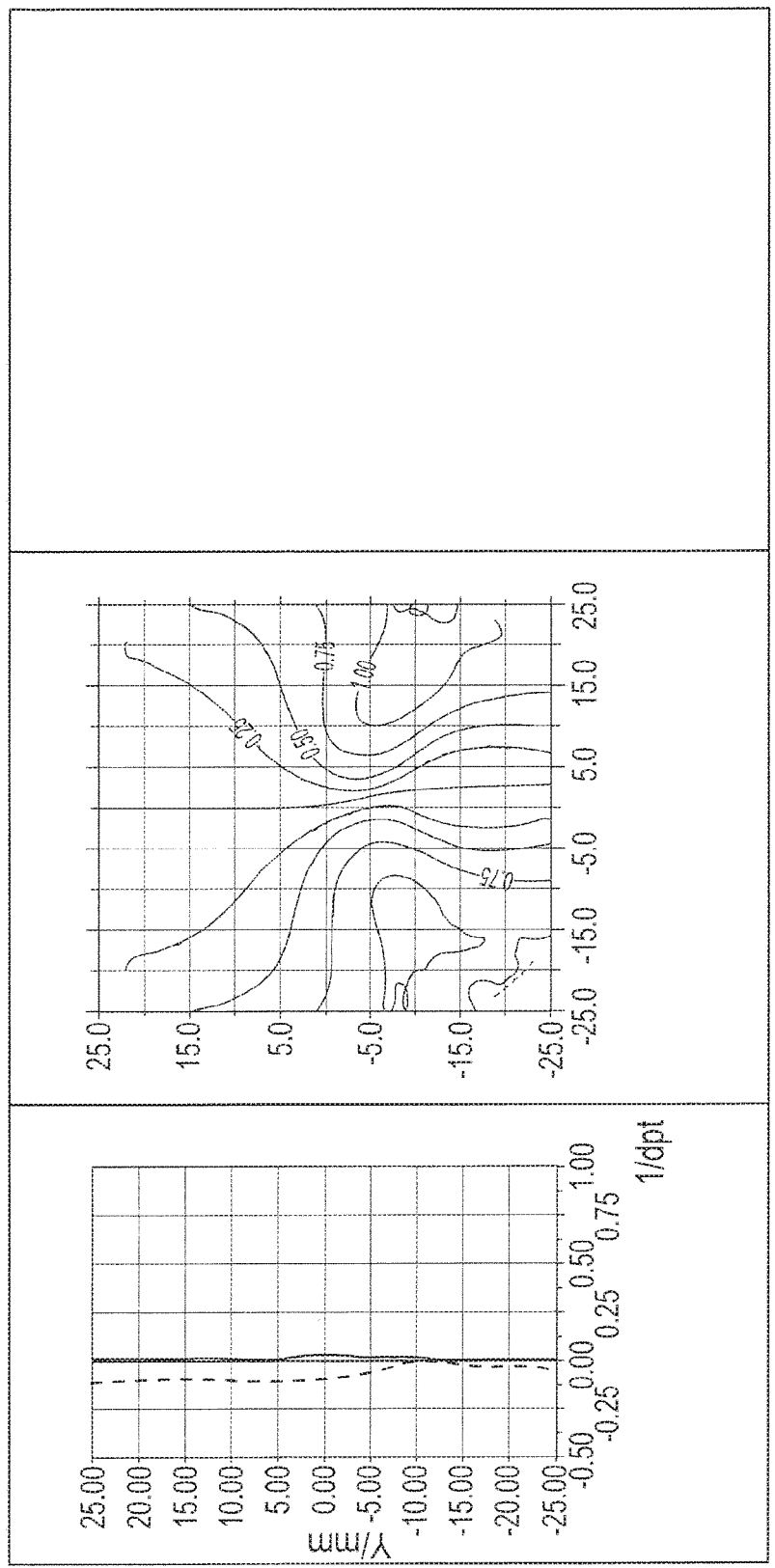
FIGS. 14A and 14B shows diagrams of an astigmatic defect and a refraction defect along a main viewing line (FIG. 14A), and an astigmatic defect in the position of use (FIG. 14B) for a conventional multifocal lens according to configuration 9.

As can be seen from FIGS. 13A-13C, with the inventive prescription surface, in addition to the setting of the full correction at the near reference point $B_N$, also a full correction of the individual near astigmatism can be set without the need of an online optimization. The progressively toric rear surface of the invention exhibits a surface astigmatism of close to 0.50 dpt in the near area (cf. FIG. 13C) which has been introduced for correction of the near astigmatism.

The configurations 9 to 11 shown in FIGS. 14A and 14B to 16A-16C each relate to a multifocal lens having a progressive front surface and a toric prescription surface.

The conventional multifocal lens according to configuration 9 represents a prefabricated blank with the prescription Sph 0.5 dpt and addition 1.0 dpt. The front surface has a progressive basic curve BK 4.0. The spherical rear surface serving as the prescription surface is optimized in the position of use with the standard parameters HSA=13 mm, VN=7° and FS=0°. As can be seen from FIGS. 14A and 14B, this conventional blank exhibits good imaging characteristics for the center of the base curve area and when used in the standard situation of use.

The spherical rear surface has no surface astigmatism, and therefore no corresponding FIG. 14C is provided.

The conventional multifocal lens of configuration 10 is based on the blank of configuration 9 and has a different prescription (Sph −1.00 dpt, cyl 3.00 dpt, axis 0°, addition 1.00 dpt) and different parameters for position of use (HSA=13 mm, VN=0°, FSW=10°).

As can be seen from FIGS. 15A and 15B, the conventional toric spectacle lens rear surface having a constant surface astigmatism can fulfill the prescription only at the distant reference point $B_F$. In the near area, very large errors occur from to the combination of astigmatic prescription, adjustment astigmatism and astigmatism of oblique bundles due to the changed parameters for position of use (cf. FIG. 15A).

However, the concept of the present invention can be applied not only to a superimposed surface on a given progressive base surface but also to a toric prescription surface. In this case, the full correction can be always achieved both at the distant reference point $B_F$ as well as at the near reference point $B_N$.

The inventive multifocal lens of configuration 11 is based on the blank of configuration 9. It has the same prescription and the same parameters for position of use as the conventional configuration 10, but a rear surface designed according to the invention. As can be seen from FIGS. 16A-16C, the rear surface designed according to the invention can completely handle the prescription values also at the near reference point $B_N$ without online optimization even in the case of astigmatic prescriptions and adjusting astigmatism.

LIST OF REFERENCE SIGNS 10 multifocal lens
12 eye
16 back surface
17 base plane of back surface
18 front surface
19 base plane of front surface
20 horizontal
21 direction of near view
$B_F$ first reference point, distant reference point
$B_N$ second reference point, near reference point
O geometric center
S vertex
VN forward inclination
(x,y) surface coordinate in x/y coordinate system
(u,v) surface coordinate in u/v coordinate system
$(c_u, c_v, \alpha)$ set of parameter of the prescription surface equation
$P_c$ power vector for the set of parameter $(c_u, c_v, \alpha)$
$T_R$ prescription surface for the set of parameters $(c_u, c_v, \alpha)$
$f(x,y)$ transfer function
$y_S$ scaling factor
$z(u,v)$ arrow height of the prescription surface in the u/v coordinate system
index F referring to the first reference point
index N referring to the second reference point

The invention claimed is:

1. A method for producing a design of a prescription surface of a multifocal lens comprising:
   obtaining first data for describing at least one aberration of an eye of a proband for a first situation of use and second data for describing the at least one aberration of the eye of the proband for a second situation of use different from the first situation of use;
   providing a prescription surface equation describing the prescription surface using a set of parameters that are changing in a controlled manner at the different coordinates of the prescription surface;
   determining a first set of parameters and a second set of parameters of the predetermined prescription surface equation from the first and second data;
   assigning the first set of parameters to a first reference point of the prescription surface for the first set of parameters, and assigning the second set of parameters to a second reference point of the prescription surface different from the first reference point for the second set of parameters;
   obtaining further sets of parameters of the prescription surface equation at further coordinates of the prescription surface, respectively, by interpolating the first set of parameters and the second set of parameters; and
   determining, by using the prescription surface equation, prescription surface values of the multifocal lens at the first reference point on the basis of the first set of parameters, at the second reference point on the basis of the second set of parameters, and at the further coordinates of the prescription surface on the basis of the further sets of parameters, respectively, wherein the prescription surface values are determined in a u/v coordinate system using arrow heights of the prescription surface according to the following equation:

$$z(u, v) = \frac{r^2 c}{1 + \sqrt{1 - r^2 c^2}}$$

with $c = c_u \cos^2\alpha + c_v \sin^2\alpha = c_u \frac{u^2}{r^2} + c_v \frac{v^2}{r^2}$ and $r^2 = u^2 + v^2$ where
z is an arrow height
u is the direction of a first main section
v is the direction of a second main section
$C_u$ is the curvature of a main section along the u axis
$C_v$ is the curvature of a main section along the v axis
$\alpha$ is the axial position of a meridional section at the coordinate u, v.

2. The method according to claim 1, wherein the prescription surface equation is a toroidal equation.

3. The method according to claim 1, wherein the interpolation of the further sets of parameters of the prescription surface equation in is performed in a parameter space of power vectors.

4. The method according to claim 1, wherein the interpolation of the further sets of parameters of the prescription surface equation is performed in a power vector notation of the parameters.

5. The method according to claim 4, wherein the interpolation of the further sets of parameters of the prescription surface equation is performed by means of the following power vector equation:

$$\vec{P}_c(x,y) = f(x, y)\vec{P}_{cF} + (1 - f(x, y))\vec{P}_{cN}$$

wherein:
$P_c(x,y)$: power vector $$\vec{P}_c = \begin{pmatrix} M \\ J_0 \\ J_{45} \end{pmatrix} = \begin{pmatrix} 0,5(c_u + c_v) \\ -0,5(c_v - c_u)\cos(2\alpha) \\ -0,5(c_v - c_u)\sin(2\alpha) \end{pmatrix}$$

$P_{cF}$: power vector calculated from the first set of parameters
$P_{cN}$: power vector calculated from the second set of parameters
$f(x,y)$: transfer function.

6. The method according to claim 5, wherein the transfer function $(f(x,y))$ is a non-linear function whose function values along the y-axis $(f(x=0,y))$ are in a range of values from 0 to 1.

7. The method according to claim 5, wherein the transfer function $(f(x,y))$ is a double asymptotic function.

8. The method according to claim 5, wherein the transfer function $(f(x,y))$ has partial derivatives with respect to x and y which are equal to zero in the first and second reference points $(B_F, B_N)$, wherein the transfer function $(f(x,y))$ preferably has a Hesse matrix which, with respect to x and y, is the zero matrix at the first and second reference points $(B_F, B_N)$.

9. The method according to claim 5, wherein the transfer function $(f(x,y))$ is defined by $$f(x, y) = 0,5 + \frac{1}{\pi}\arctan\left(\frac{y - y_0}{y_S}\right)$$

where $y_S$ is a scaling factor.

10. The method according to claim 9, wherein the scaling factor ($y_S$) of the transfer function ($f(x,y)$) is in a range of 4 mm to 15 mm.

11. The method according to claim 9, wherein the scaling factor ($y_S$) of the transfer function ($f(x,y)$) is a scaling factor ($y_S(x)$) depending from the x coordinate.

12. The method according to claim 11, wherein the scaling factor ($y_S(x)$) of the transfer function ($f(x,y)$) depending from the x coordinate is defined by $$y_S(x) = y_{SRand} + (y_{SZentrum} - y_{SRand})e^{\frac{-x^2}{b}}$$

with $$b = \frac{-(\Delta x)^2}{\ln(0,5)},$$

where $\Delta x$ is the full width at half maximum of a Gaussian curve,
where
$y_{SRand}$ denotes the value of the scaling factor $y_S$ at an outer edge of the spectacle lens "$y_{SZentrum}$" denotes the value of the scale factor $y_S$ on a central vertical section.

13. A method for producing a multifocal lens having a front surface and a back for a progressive spectacle lens, in which a design of a prescription surface is created by a method according to claim 1.

14. An apparatus for producing a multifocal lens having a front surface and a back surface for a progressive spectacle lens, comprising means for creating a design of a prescription surface of the multifocal lens which is configured to create the design of the prescription surface according to claim 1.

15. A computer program product configured to perform a method of creating a design of a prescription surface of a multifocal lens according to claim 1, when loaded and executed on a computer.

16. A storage medium having a computer program stored thereon, wherein the computer program is configured to perform a method of creating a design of a prescription surface of a multifocal lens according to claim 1, when loaded and executed on a computer.

17. The method according to claim 1, wherein the multifocal lens is a progressive spectacle lens.

18. A multifocal lens for a progressive spectacle lens, having a rear surface and a front surface, wherein
a prescription surface of the multifocal lens comprises a first reference point at which at least one aberration of an eye of a proband is corrected for a first situation of use, and a second reference point at which the at least one aberration of the eye of the proband is corrected for a second situation of use; and
a design of the prescription surface is configured such that prescription surface values of the prescription surface at further coordinates of the prescription surface are determined via an interpolation of further sets of parameters of a predetermined prescription surface equation from a first set of parameters of the prescription surface equation at the first reference point and a second set of parameters of a prescription surface equation at the second reference point, wherein the prescription surface values are determined in a u/v coordinate system using arrow heights of the prescription surface according to the following equation:

$$z(u, v) = \frac{r^2 c}{1 + \sqrt{1 - r^2 c^2}}$$

with $c = c_u \cos^2 \alpha + c_v \sin^2 \alpha = c_u \frac{u^2}{r^2} + c_v \frac{v^2}{r^2}$ and $r^2 = u^2 + v^2$ where
z is an arrow height
u is the direction of a first main section
v is the direction of a second main section
$C_u$ is the curvature of a main section along the u axis
$C_v$ is the curvature of a main section along the v axis
α is the axial position of a meridional section at the coordinate u, v.

19. The multifocal lens according to claim 18, wherein the design of the prescription surface is created by a method comprising: obtaining first data for describing at least one aberration of an eye of a proband for a first situation of use and second data for describing the at least one aberration of the eye of the proband for a second situation of use different from the first situation of use;
providing a prescription surface equation describing the prescription surface using a set of parameters that are changing in a controlled manner at the different coordinates of the prescription surface;
determining a first set of parameters and a second set of parameters of the predetermined prescription surface equation from the first and second data;
assigning the first set of parameters to a first reference point of the prescription surface for the first set of parameters, and assigning the second set of parameters to a second reference point of the prescription surface different from the first reference point for the second set of parameters;
obtaining further sets of parameters of the prescription surface equation at further coordinates of the prescription surface, respectively, by interpolating the first set of parameters and the second set of parameters; and
determining, by using the prescription surface equation, prescription surface values of the multifocal lens at the first reference point on the basis of the first set of parameters, at the second reference point on the basis of the second set of parameters, and at the further coordinates of the prescription surface on the basis of the further sets of parameters, respectively.

* * * * *